United States Patent [19]

Bendiks

[11] 4,284,899

[45] Aug. 18, 1981

[54] GRAVITY FED POWER GENERATOR

[76] Inventor: Donald J. Bendiks, 1020 Water St., New Buffalo, Mich. 49117

[21] Appl. No.: 90,673

[22] Filed: Nov. 2, 1979

Related U.S. Application Data

[63] Continuation of Ser. No. 18,605, Mar. 8, 1979, abandoned.

[51] Int. Cl.³ .......................... F03B 13/06; H02K 7/18
[52] U.S. Cl. ...................................... 290/1 R; 290/52; 290/54
[58] Field of Search .................... 290/1, 2, 43, 44, 52, 290/54, 55

[56] References Cited

U.S. PATENT DOCUMENTS

| | | | |
|---|---|---|---|
| 3,484,617 | 12/1969 | Winsel | 290/44 |
| 4,075,838 | 2/1978 | Pelin | 290/1 R X |
| 4,095,118 | 6/1978 | Rathbun | 290/52 X |

Primary Examiner—J. V. Truhe
Assistant Examiner—W. E. Duncanson, Jr.

[57] ABSTRACT

A power supply generator system including a fuel cell, an impulse turbine, an electrolyzer and a regulator battery which serve to supply each other and a consumer with energy. The fuel cell combines hydrogen and oxygen to produce electricity and water. The fuel cell is located at a distance above the impulse turbine and the water from the fuel cell falls to activate the turbine which produces energy. The water then flows to the electrolyzer to be separated into hydrogen and oxygen for fuel cell use.

6 Claims, 6 Drawing Figures $$KW = \frac{(CU.FT/sec)(HEIGHT/Ft)(EFF-80\%)}{11.8}$$

GRAVITY FED POWER GENERATOR

SUMMARY OF THE INVENTION

This application is a continuation of application Ser. No. 018,605, filed Mar. 8, 1979 now abandoned.

This invention relates to a power supply generator system having in combination a fuel cell, an impulse turbine generator and an electrolyzer.

The combination of these units into one system represents an innovation in power generators. The individual units act synergistically to produce fuel and/or energy to feed other components as well as produce energy through the combination of hydrogen and oxygen and, also, has water as a by-product. With the fuel cell located at an appropriate height above the impuse turbine, the falling water from the fuel cells possesses sufficient kinetic energy to activate the turbine. The turbine produces electricity and as the water exits the turbine it flows to the electrolyzer where it is separated into hydrogen and oxygen with the hydrogen being produced for use in the fuel cell.

The fuel cell, in turn, produces electricity for use in running the electrolyzer with any excess being stored in batteries for future use within the system or by a consumer.

Accordingly, it is the object of this invention to provide an economical means for producing energy.

Another object of this invention is to combine the separate units of fuel cell, impulse turbine and electrolyzer into an efficient energy producing system.

Still another object of this invention is to provide a new source of electrical energy.

Other objects of this invention will be apparent upon a reading of the following description.

DESCRIPTION OF THE PREFERRED EMBODIMENTS

Figure 1:
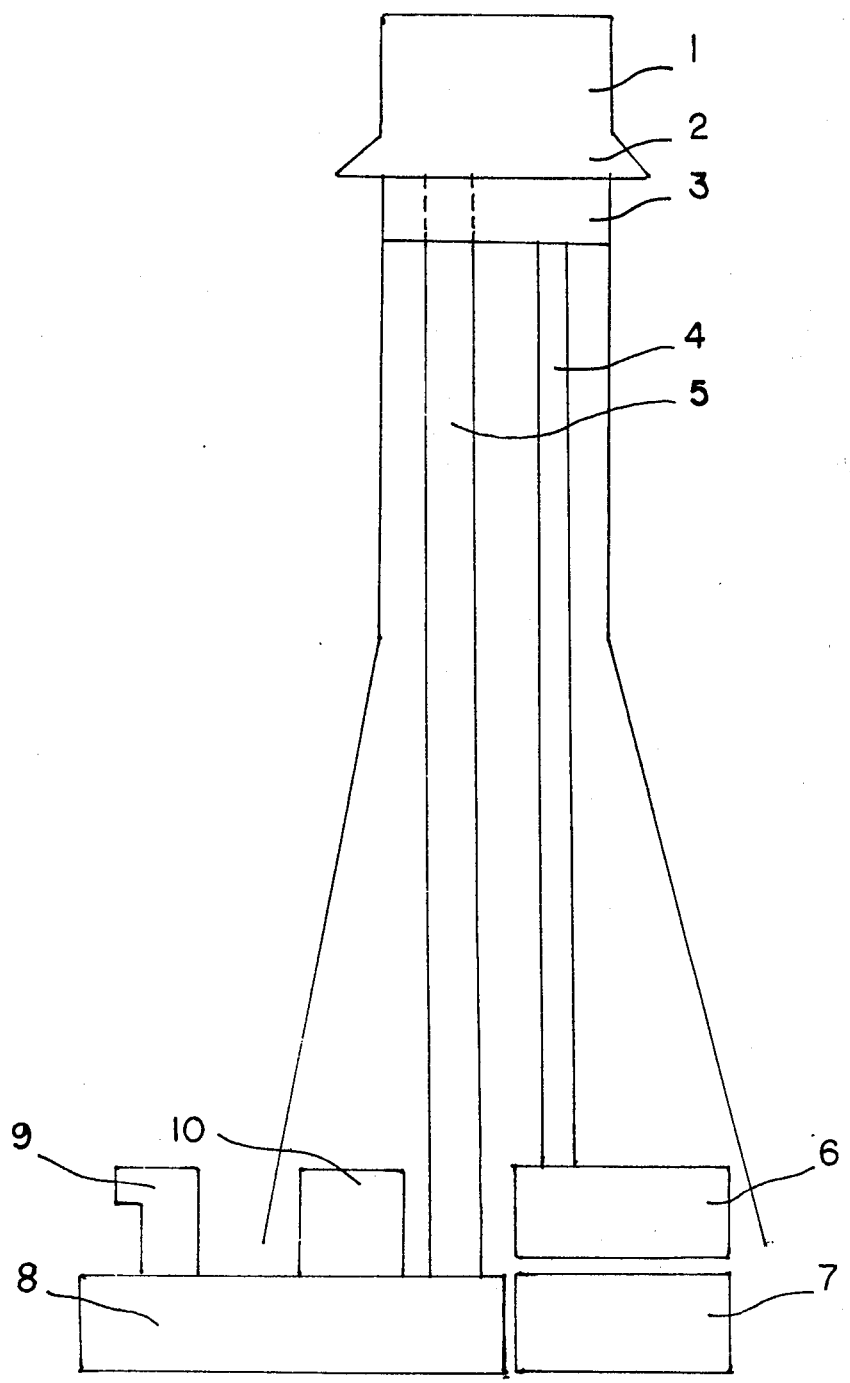
FIG. 1 shows a diagrammatic elevational view of the system.

Referring to the drawings, FIG. 1 shows the overall arrangement of the components of the invention. The system includes a fuel cell 1, impulse turbine 6, generator 7, an electrolyzer 8 and storage battery 10. These components functionally combine to produce and store energy from an abundant fuel source, water.

Figure 2:
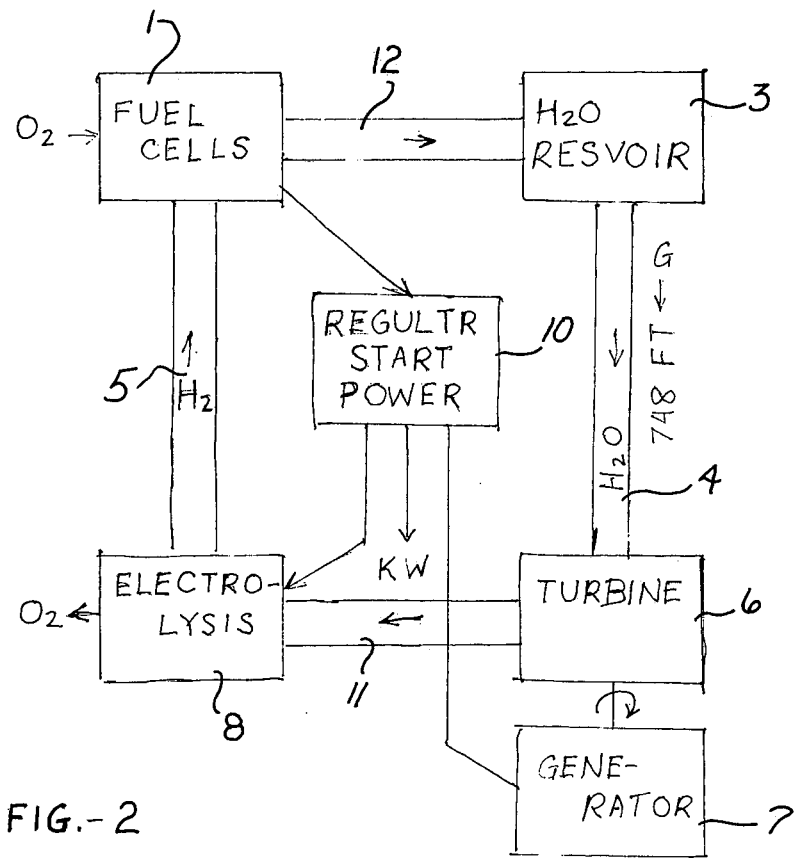
FIG. 2 is a schematic of the cycle of the energy production for the system.
Figure 3:
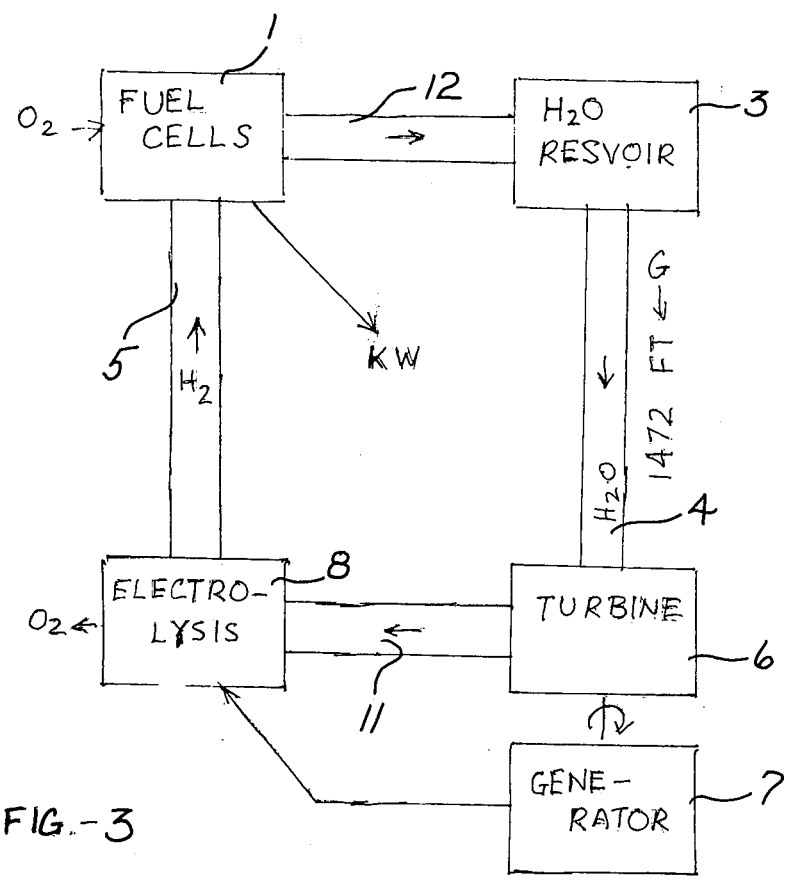
FIG. 3 is a schematic of another cycle of energy production for the system.

Referring to FIGS. 2 and 3, following the water through a cycle and beginning at water reservoir tank 3, the water possesses potential energy due to the height of the water reservoir tank.

Upon release from water reservoir tank 3, the water falls by gravity down conduit 4 to turbine 6. During its descent, the potential energy of the water at the top of conduit 4 is changed to kinetic energy. The kinetic energy of the water turns the impellers of turbine 6. The rotation of turbine 6 in turn causes rotation of connected generator 7. Generator 7 produces energy which is transferred to Upon exitig turbine 6, the water is routed to electrolyzer 8 through conduit 11. Within electrolyzer 8, water is separated into its components, oxygen and hydrogen. The energy required for electrolyzer 8 comes from generator 7 in FIG. 3 and from the generator and a regulator or storage battery 10 in FIG. 2.

Figure 4:
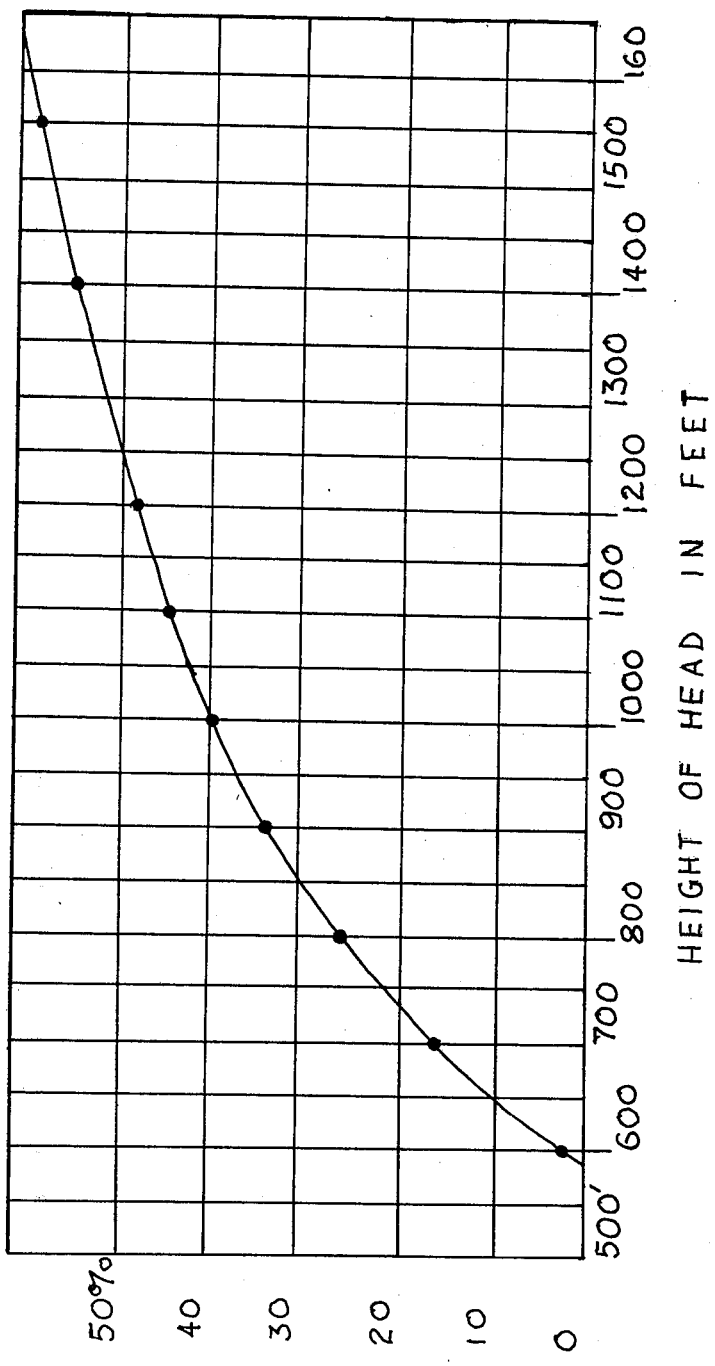
FIG. 4 is a graph depicting the production of energy using the invention.

If the height of water reservoir tank 3 is sufficient, then supplemental power will not be required from storage battery 10 used in FIG. 2. With water reservoir tank 3 located at 1472 feet above turbine 6, generator 7 is capable of producing sufficient power to operate electrolyzer 8. FIG. 4 displays the increase in the amount of power produced as the height of water reservoir tank 3 above turbine 6 increases.

Electrolyzer 8 has a vent 9 (see FIG. 1) through which the oxygen produced is released to the atmosphere. Hydrogen produced through the electrolysis is pumped up conduit 5 to fuel cell 1.

Fuel cell 1 is an ion transfer cell, similar to those used on space flights. An example of such a fuel cell is the Allis-Chalmers hydrogen-oxygen fuel cell as shown on page 533 of *Fuel Cells—Their Electrochemistry* by Bockris and Srinivasan. Within fuel cell 1, hydrogen is recombined with oxygen which has been introduced to the fuel cell is atmospheric oxygen through air intake vent 2. By means of ion transfer the hydrogen and oxygen are recombined to produce electricity and water. The water produced flows through conduit 12 to water tank 3 to begin the cycle anew. The electricity produced by fuel cell 1 is directed, in FIG. 2, to regulator-storage battery 10 where it is available for use when needed for consumer use or as a power additive for the electrolyzer 8. THe power stored in the regulator-storage battery 10 may also be used in the electrolyzer 8 to restart the system after a shut down.

Figure 5:
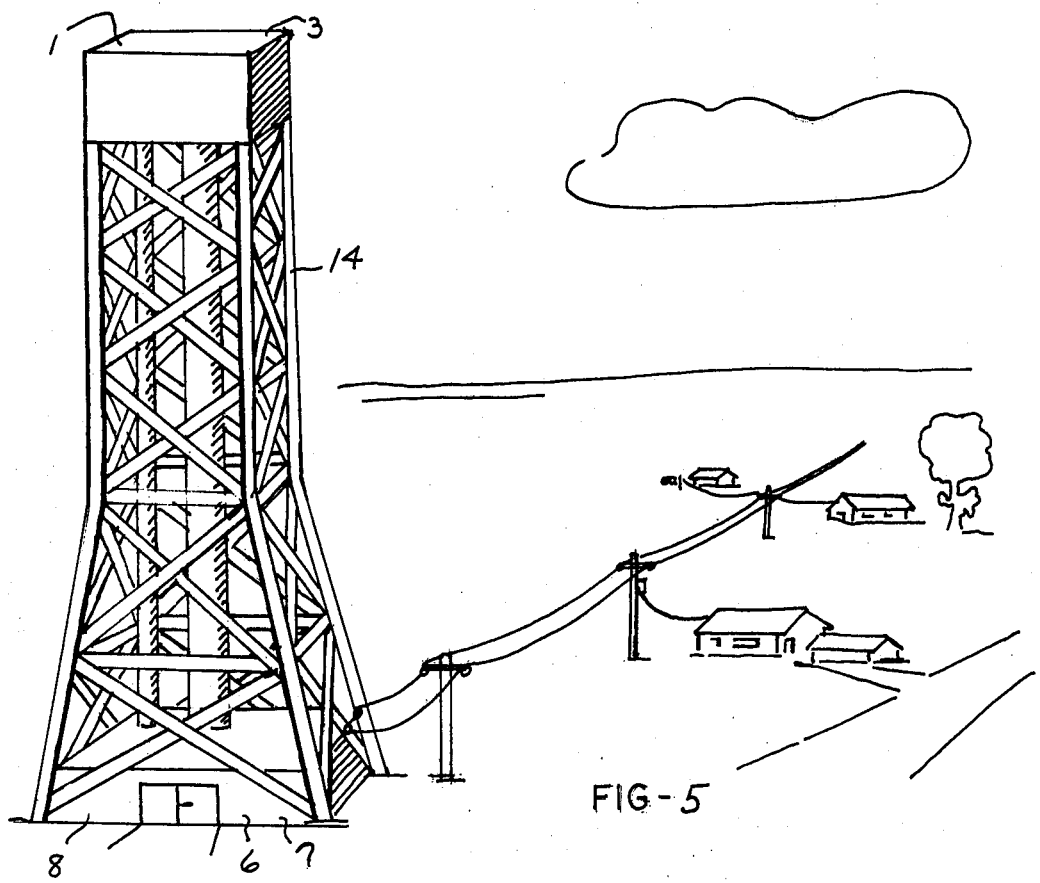
FIG. 5 is a perspective view of the system in use.
Figure 6:
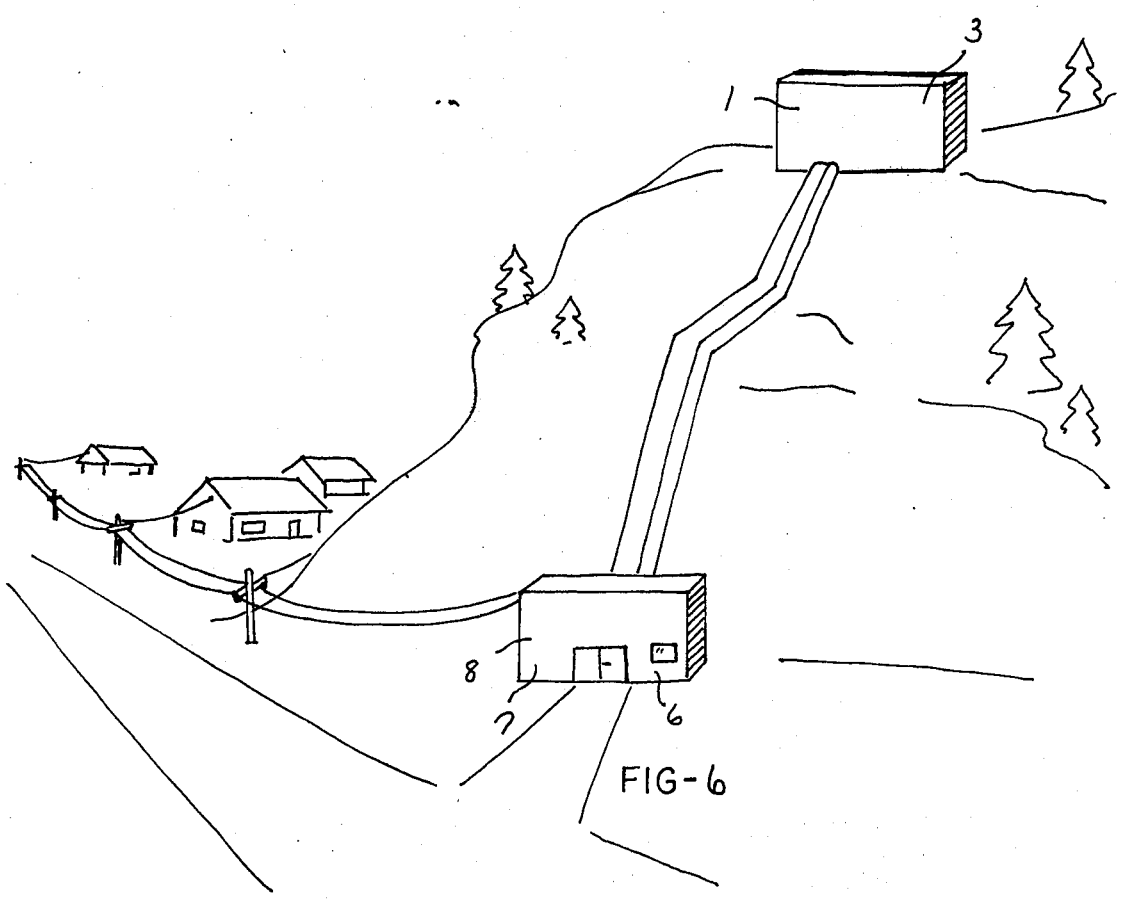
FIG. 6 is a perspective view of another embodiment of the system in use.

FIGS. 5 and 6 depict different embodiments of the system to accommodate the site of construction. As seen in FIG. 5, a tower 14 can be utilized to house the fuel cell and water tank when the land is flat. On the other hand, if the area is mountainous or hilly, the fuel cell and water tank can be located at the top or at any desired point up the side of the hill, as shown in FIG. 6.

The projected maximum combined efficiency of this system is about 50%. Therefore, water reservoir tank 3 is adapted to periodically release a predetermined amount of water into the system. By doing this, water need only be added to the reservoir periodically rather than continuously for replenishment purposes.

It is to be understood that the invention is not to be limited to the details above given but may be modified within the scope of the appended claims.

What I claim is:

1. A power supply generator system comprising in combination a fuel cell within which hydrogen gas and oxygen are combined to produce water and electrical energy, an impulse turbine, said fuel cell being located above said turbine, said turbine including impeller means, conduit means extending downwardly from said fuel cells to said turbine for conducting by gravitational fall the water produced by said fuel cell to said turbine impeller means to cause rotation of the impeller means for providing electricity upon rotation of said impeller means, an electrolyzer means for producing hydrogen gas by the electrolysis of water, conduit means connecting said turbine with said electrolyzer means for conducting water from said turbine impeller means to the electrolyzer means to produce hydrogen, conduit means connecting said electrolyzer means with said fuel cell for conducing hydrogen to the fuel cell to produce water.

2. The generator system of claim 1 wherein the physical location of said electrolyzer means relative to the turbine being such that the kinetic energy of the water in said connecting conduit means when exiting said turbine being sufficient to independently enter the electrolyzer means.

3. The generator system of claim 1 and including electrical energy storage means for storing the electricity produced by said fuel cell and said generator.

4. The generator system of claim 2 wherein said fuel cell is located at least 748 feet above said turbine.

5. The generator system of claim 1 wherein said first mentioned conduit means includes a reservoir for said water, said reservoir being located above said turbine at a location wherein said water passing from the reservoir to the turbine will cause rotation of said turbine impeller means.

6. The generator system of claim 1 and including a regulator means for directing energy produced in said fuel cells to said electrolyzer means.

* * * * *